(12) United States Patent
Youm et al.

(10) Patent No.: US 7,138,614 B2
(45) Date of Patent: Nov. 21, 2006

(54) NON-CONTACT FEEDER SYSTEM

(75) Inventors: Jang-hyoun Youm, Suwon-si (KR); Sang-don Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 10/837,296

(22) Filed: May 3, 2004

(65) Prior Publication Data
US 2005/0127066 A1    Jun. 16, 2005

(30) Foreign Application Priority Data
Dec. 10, 2003    (KR) .................... 10-2003-0089456

(51) Int. Cl.
*H05B 6/04* (2006.01)
*H02M 3/335* (2006.01)

(52) U.S. Cl. .................................. 219/660; 363/16
(58) Field of Classification Search ............ 219/660, 219/651, 600, 482, 702, 778; 363/16, 21.08, 363/21.16, 27, 29, 40, 23
See application file for complete search history.

(56) References Cited

U.S. PATENT DOCUMENTS

| 5,898,579 | A | * | 4/1999 | Boys et al. ............ 363/23 |
| 5,968,398 | A | * | 10/1999 | Schmitt et al. .......... 219/626 |
| 6,040,986 | A | * | 3/2000 | Sakamoto et al. ....... 363/21.02 |
| 6,108,216 | A | * | 8/2000 | Abe et al. ............. 363/17 |
| 6,430,064 | B1 | * | 8/2002 | Tsuchimoto et al. ...... 363/24 |
| 6,504,732 | B1 | * | 1/2003 | Abe .................. 363/17 |
| 6,521,875 | B1 | * | 2/2003 | Kim et al. ............ 219/715 |
| 6,664,523 | B1 | * | 12/2003 | Kim et al. ............ 219/722 |
| 6,744,209 | B1 | * | 6/2004 | Jang et al. ............ 315/39.51 |

FOREIGN PATENT DOCUMENTS

| JP | 6-321351 | | 11/1994 |
| JP | 9-121481 | * | 5/1997 |
| JP | 10-80076 | | 3/1998 |
| JP | 10-94103 | | 4/1998 |
| JP | 11-164497 | | 6/1999 |
| JP | 2000-173843 | | 6/2000 |
| JP | 2001-177901 A | | 6/2001 |

(Continued)

OTHER PUBLICATIONS

Office Action issued on Jul. 15, 2005, for Korean Patent Application No. 2003-0089456.

*Primary Examiner*—Daniel Robinson
(74) *Attorney, Agent, or Firm*—Stanzione & Kim, LLP (57) ABSTRACT

A non-contact feeder system to supply an induced current to an electrical load includes at least three feeding cables arranged approximately parallel with one another along a moving direction of the electrical load; a plurality of AC power supplies to supply AC currents to the feeding cables; pick-up parts to supply an induced current, induced from a magnetic field formed by the AC current flowing through each of the feeding cables, to the electrical load and to be movable along the feeding cables without contacting the feeding cables as the electrical load moves; and a controller to control the plurality of AC power supplies, so that phases of the AC currents supplied from the AC power supplies are the same, and directions of the AC currents flowing through the feeding cables positioned adjacent to one another are reverse with respect to one another. Thus, the space to mount components in the non-contact feeder system is decreased and the induced current is improved.

25 Claims, 10 Drawing Sheets

FOREIGN PATENT DOCUMENTS

| | | |
|---|---|---|
| JP | 2001-309502 A | 11/2001 |
| JP | 2002-78103 A | 3/2002 |
| JP | 2003-61268 A | 2/2003 |
| KR | 10-180047 | 11/1998 |
| KR | 1999-72906 | 9/1999 |
| KR | 10-313752 | 10/2001 |
| KR | 10-353044 | 9/2002 |
| KR | 2002-90131 | 11/2002 |

* cited by examiner

NON-CONTACT FEEDER SYSTEM

CROSS-REFERENCE TO RELATED APPLICATIONS

This application claims the benefit of Korean Patent Application No. 2003-89456 filed on Dec. 10, 2003, in the Korean Intellectual Property Office, the disclosure of which is incorporated herein by reference.

BACKGROUND OF THE INVENTION

1. Field of the Invention

The present invention relates to a non-contact feeder system, and more particularly, to a non-contact feeder system in which a phase and a direction of an AC current of a feeding cable are controlled or a connection structure of the feeding cable is improved, thereby decreasing a space to mount the non-contact feeder system and improving an efficiency of a power supply.

2. Description of the Related Art

To carry products or determine positions of the products on a production line or a distribution system, a moving system having a moving object, such as a carrier, is generally used. To supply an electrical power to the moving object and operate the moving object, a power cable has been connected to the moving object, which causes noise and dust because the power cable is dragged together with the moving object. Further, the power cable may be damaged or cut because the power cable is repeatedly bent while being dragged.

To solve the above problem, a non-contact feeder system supplies the electrical power to a moving object without contacting a power cable to the moving object. In the non-contact feeder system, a feeding cable, through which an AC current flows, is prepared along a moving direction of the moving object, and an induced current is generated from a magnetic field formed around the AC current flowing through the feeding cable and is supplied to the moving object.

Figure 1:
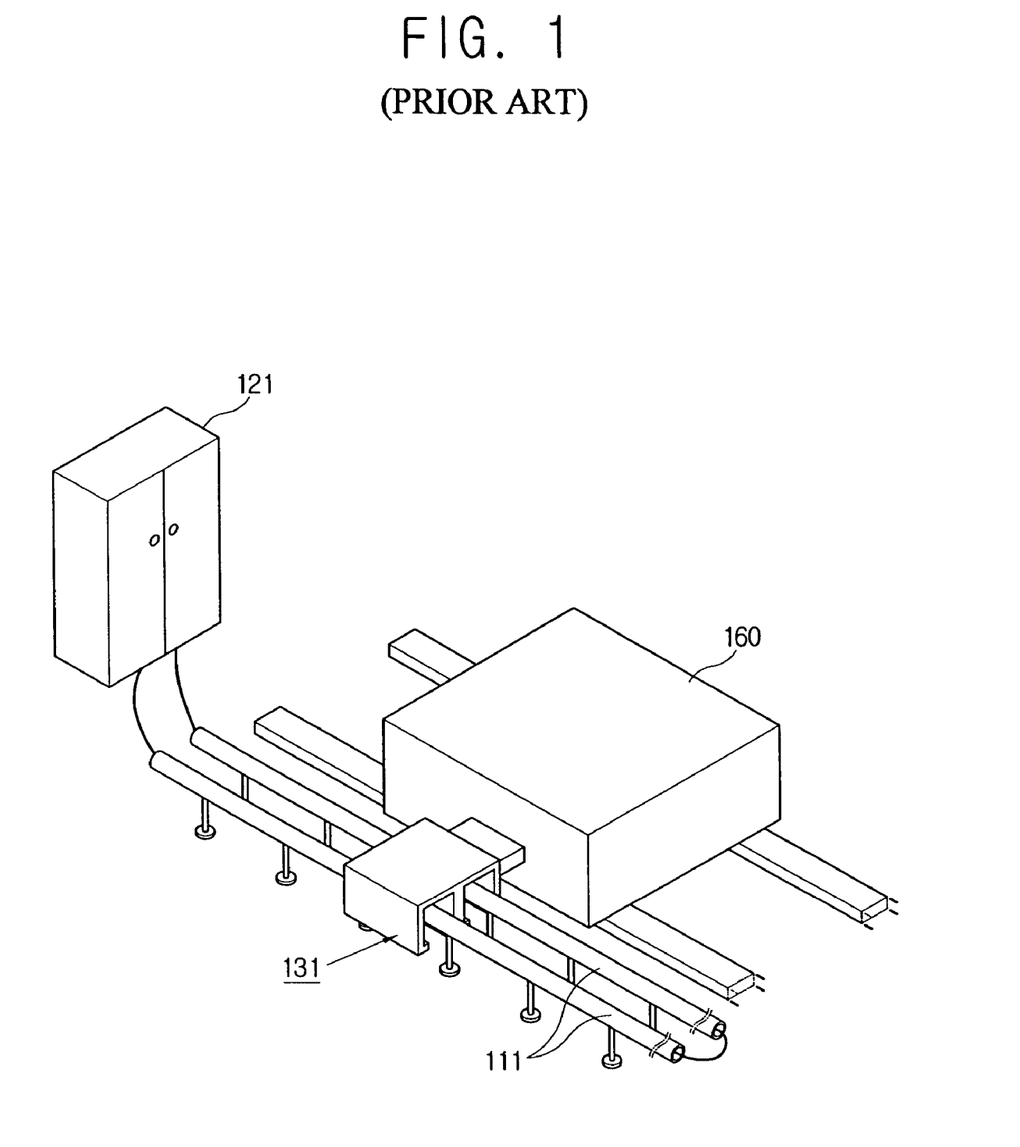
FIG. 1 shows a conventional non-contact feeder system having an AC power supply.

As shown in FIG. 1, a conventional non-contact feeder system comprises an AC power supply 121 to supply an AC current, a parallel round cable 111 arranged along a moving direction of a moving object 160, which moves back and forth with respect to the parallel round cable 111, and a pick-up part 131 moving together with the moving object 160 and inducing an induced current from a magnetic field formed around an AC current flowing through the parallel round cable 111.

Figure 2:
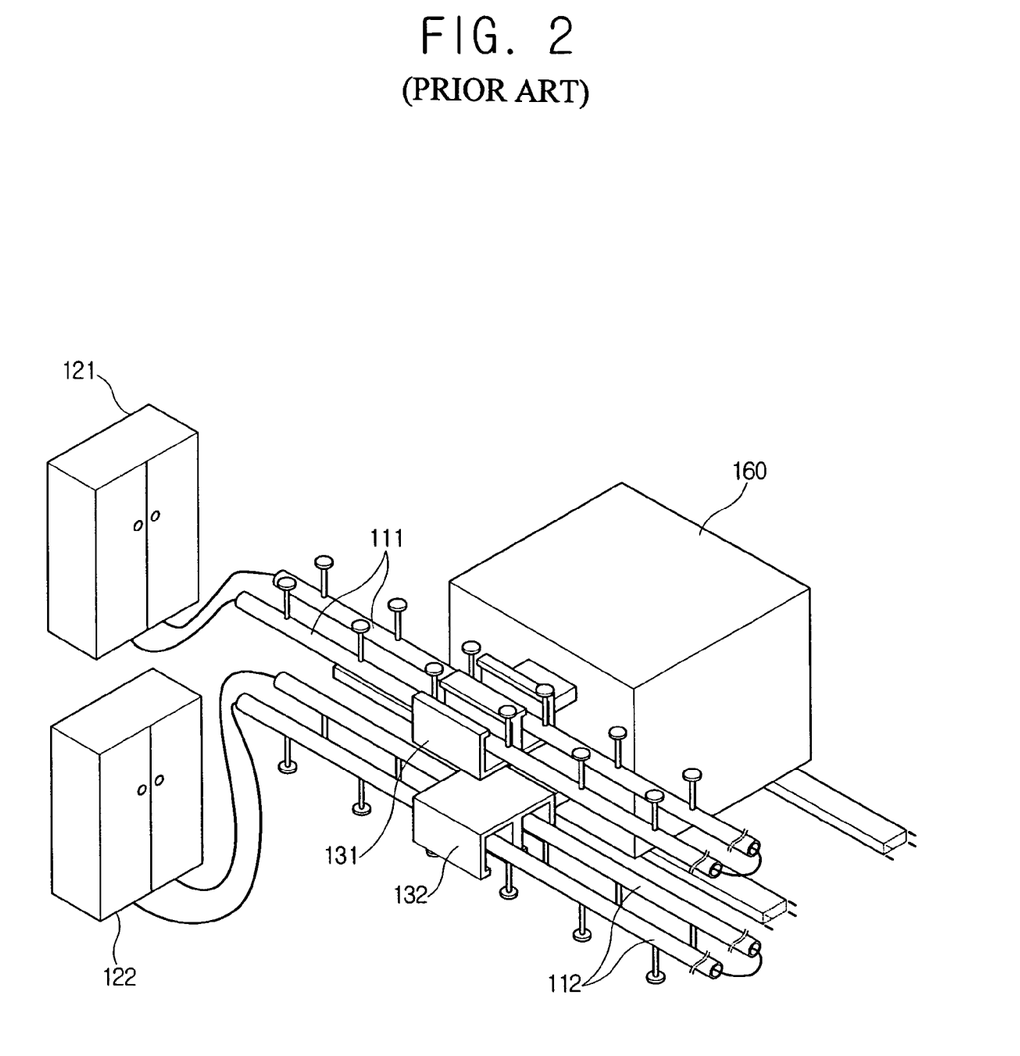
FIG. 2 shows a conventional non-contact feeder system having two AC power supplies.

As an electrical capacity required for the moving object 160 increases, as shown in FIG. 2, a non-contact feeder system having two AC power supplies 121 and 122 and two parallel round cables 111 and 112 connected to corresponding ones of the AC power supplies 121 and 122 has been used to supply an electrical power to the moving object 160.

Figure 3:
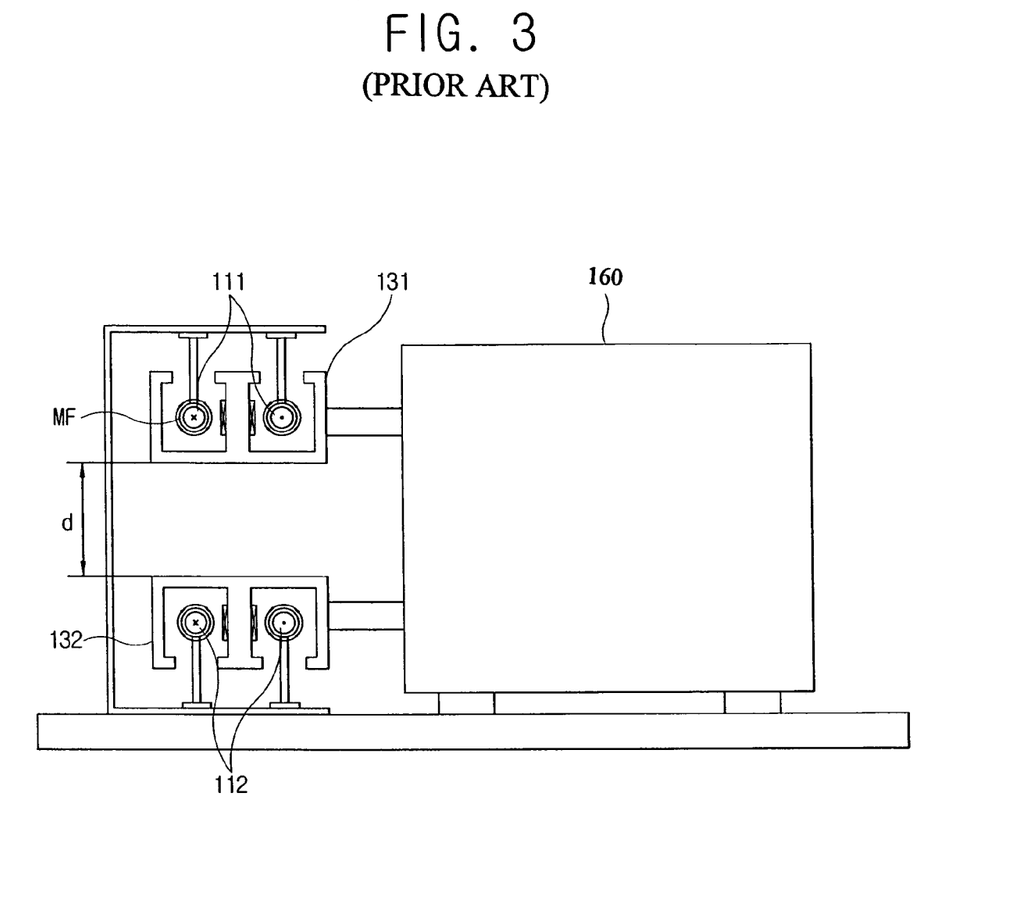
FIG. 3 is a cross-sectional view showing pickup parts and round cables of the non-contact feeder system shown in FIG. 2.

However, in the conventional non-contact feeder system, if AC currents are supplied to the two parallel round cables 111 and 112 by using the two AC power supplies 121 and 122, the pick-up parts 131 and 132 covering each of the parallel round cables 111 and 112 should be spaced apart from each other at a predetermined interval "d" as shown in FIG. 3. This is required because each of the AC power supplies 121 and 122 is separately controlled and a phase and a direction of an AC current supplied from each of the AC power supplies 121 and 122 to each of the corresponding parallel round cables 111 and 112 are separately determined. Thus, a direction of a magnetic field formed around one of the parallel round cables 111 and 112 is formed independently from the other one of the parallel round cables 111 and 112. If each AC current has a direction as shown in FIG. 3, the magnetic fields formed around the parallel round cables 111 and 112 destructively interfere with each other, thereby decreasing an efficiency of the induced current.

Thus, in the conventional non-contact feeder system, if more than two parallel round cables 111 and 112 are prepared to supply the AC currents from more than two AC power supplies 121 and 122 to the moving object, the parallel round cables 111 and 112 should be spaced apart from each other at predetermined intervals, thereby decreasing the efficiency of the induced current.

SUMMARY OF THE INVENTION in order to solve the foregoing and/or other problems, it is an aspect of the present invention to provide a non-contact feeder system in which a phase and a direction of an AC current of a feeding cable are controlled or a connection structure of the feeding cable is improved, thereby decreasing space to mount the non-contact feeder system and improving an efficiency of an induced current.

Additional aspects and/or advantages of the invention will be set forth in part in the description which follows and, in part, will be obvious from the description, or may be learned by practice of the invention.

The foregoing and/or other aspects of the present invention are achieved by providing a non-contact feeder system to supply an induced current to an electrical load, the non-contact feeder system comprising: at least three feeding cables arranged substantially parallel with one another along a moving direction of the electrical load; a plurality of AC power supplies to supply AC currents to the feeding cables; pick-up parts to supply an induced current, induced from a magnetic field formed by an AC current flowing through a corresponding one of the feeding cables, to the electrical load and to be movable along the feeding cables without contacting corresponding ones of the feeding cables as the electrical load moves; and a controller to control the plurality of AC power supplies, so that phases of the AC currents supplied from corresponding ones of the AC power supplies are the same, and directions of the AC currents flowing through corresponding ones of the feeding cables positioned adjacent to one another are reverse with respect to one another.

According to an aspect of the invention, each of the AC power supplies comprises an inverter having a plurality of switch elements to supply the AC current to the corresponding feeding cable, and the controller controls the switching elements of each of the inverters to control the phase and the direction of the AC current outputted from each of the AC power supplies.

According to another aspect of the invention, at least a pair of the feeding cables form a parallel round cable connected to opposite ends of one of the AC power supplies in series.

According to yet another aspect of the invention, each of the pick-up parts comprises: a pick-up core of a tube shape that winds (surrounds) a corresponding one of the feeding cables without making contact therewith, and is arranged adjacent to the other pick-up core; and a pick-up coil wound around the pick-up core to supply the induced current induced from a magnetic field formed by each of the feeding cables to the electrical load.

According to still another aspect of the invention, each of the pick-up cores is of a substantially rectangular section in a transverse direction of a moving direction of the electrical load and arranged adjacent to one another by closely contacting each other.

According to another aspect of the invention, directions of AC currents of the feeding cables passing through the pick-up cores adjacent to one another are reverse with respect to one another.

According to another aspect of the invention, each pair of the feeding cables forming the parallel round cable pass through a corresponding one of the pick-up cores disposed adjacent to one another, respectively.

According to another aspect of the invention, the pick-up coil is wound around the pair of pick-up cores adjacent to one another.

According to another aspect of the invention, the at least 3 feeding cables disposed parallel and adjacent to one another are connected in series so that the AC currents supplied from the corresponding ones of the AC power supplies have directions reverse with respect to one another.

The foregoing and/or other aspects of the present invention are also achieved by providing a non-contact feeder system to supply an induced current to an electrical load, the non-contact feeder system comprising: at least three feeding cables arranged substantially parallel with one another along a moving direction of the electrical load; a plurality of AC power supplies to supply AC currents to corresponding ones of the feeding cables; and a plurality of pick-up parts to supply an induced current, induced from a magnetic field formed by an AC current flowing through a corresponding one of the feeding cables, to the electrical load, and to be movable along the feeding cables without contacting the feeding cables as the electrical load moves, wherein the feeding cables are arranged in series so that directions of the AC currents of the feeding cables, positioned adjacent to one another, are reverse with respect to one another.

BRIEF DESCRIPTION OF THE DRAWINGS

The above and other aspects and/or advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 4:
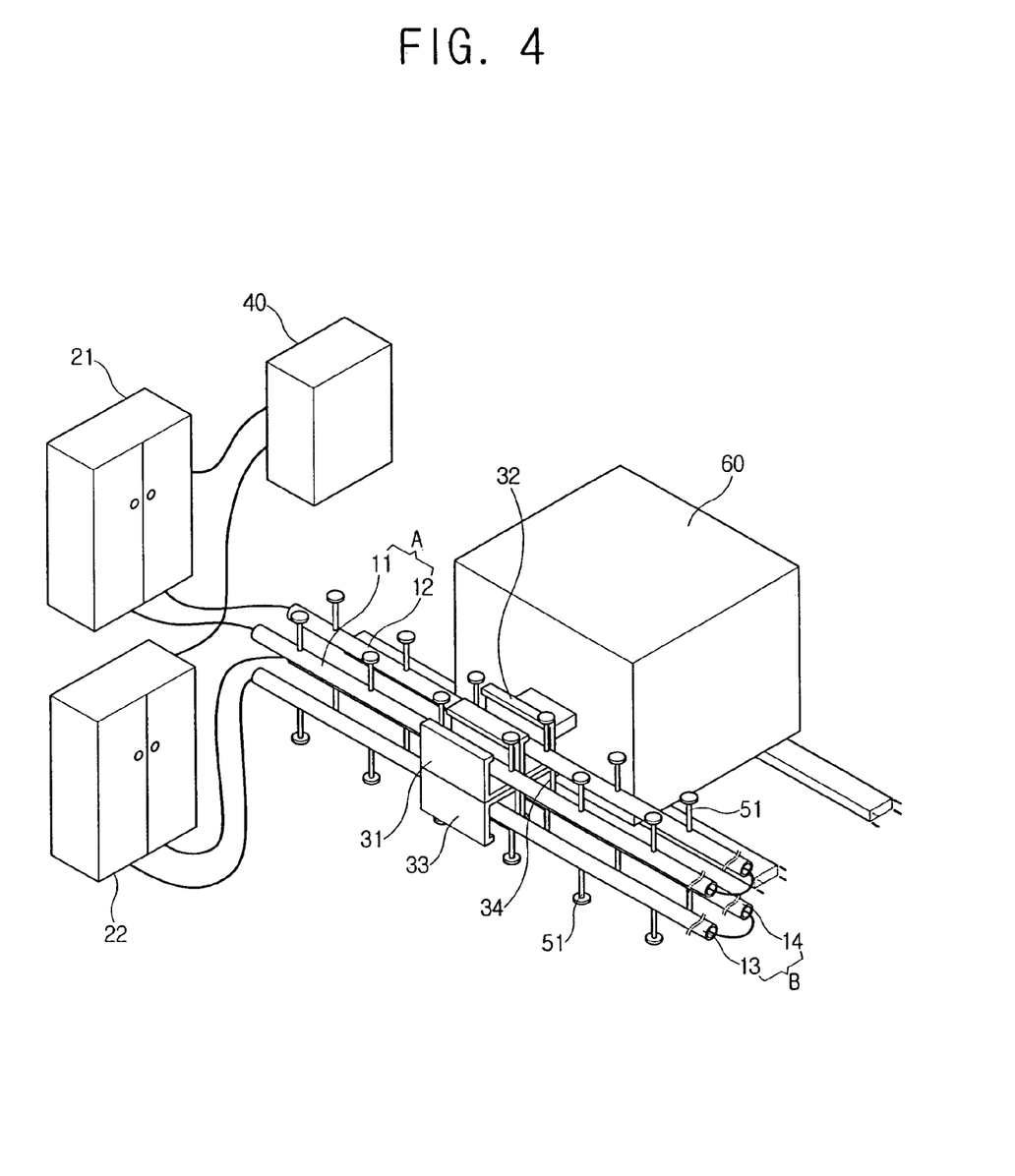
FIG. 4 shows a non-contact feeder system according to an embodiment of the present invention.

FIG. 4 shows a non-contact feeder system according to an embodiment of the present invention.

Figure 5:
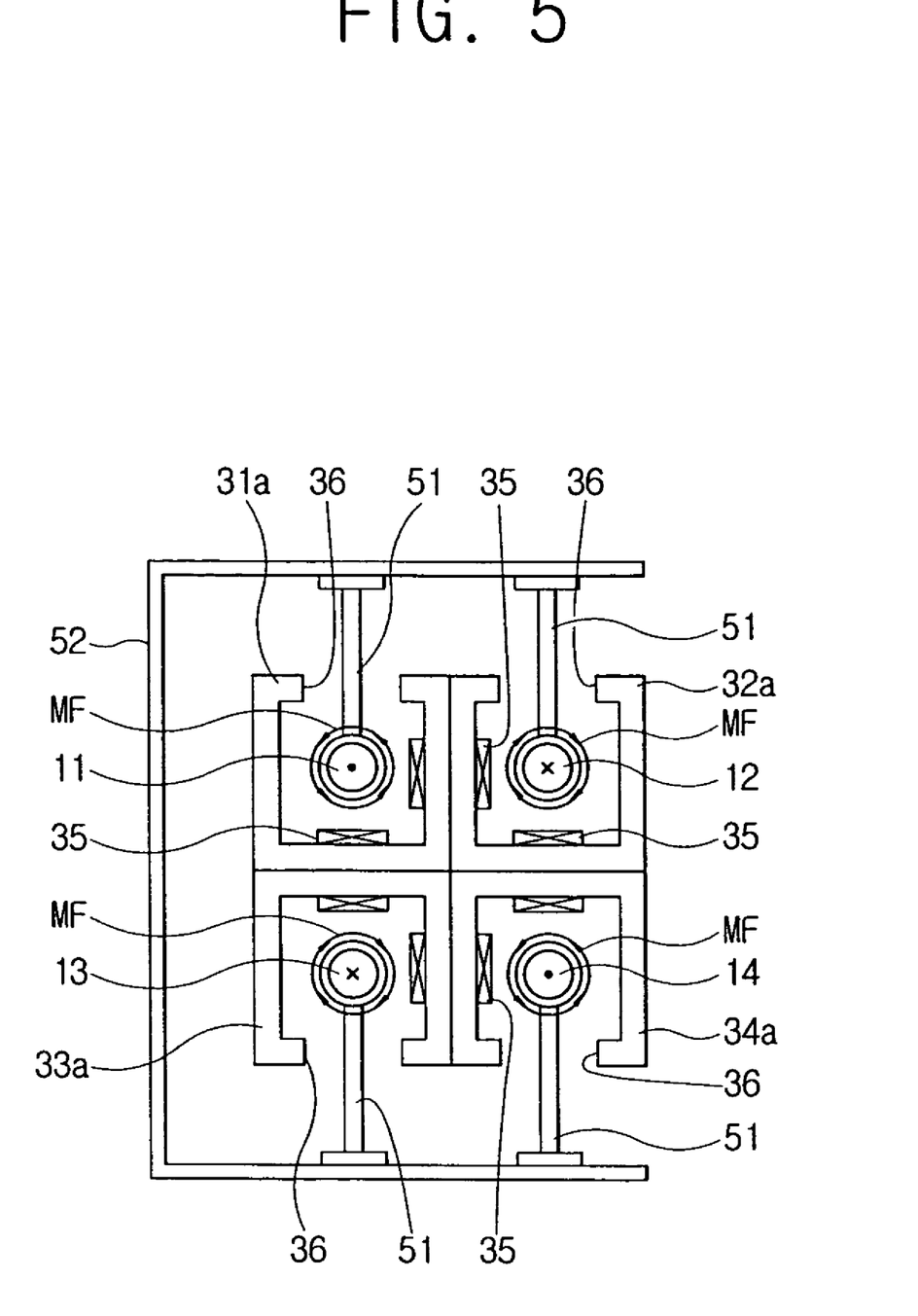
FIG. 5 is a partial sectional view showing pickup parts and round cables of the non-contact feeder system shown in FIG. 4.

As shown in FIGS. 4 and 5, the non-contact feeder system to supply an induced current to an electrical load 60, such as a carrier, comprises a plurality of AC power supplies 21 and 22, feeding cables 11, 12, 13, and 14, pick-up parts 31, 32, 33, and 34 and a controller 40. An example of the non-contact feeder system according to this embodiment of the present invention comprising four feeding cables 11, 12, 13 and 14 is described. For convenience of understanding, the feeding cables 11, 12, 13 and 14 are defined as a first feeding cable 11, a second feeding cable 12, a third feeding cable 13 and a fourth feeding cable 14, respectively. Further, the pick-up parts 31, 32, 33 and 34 corresponding to the respective feeding cables 11, 12, 13 and 14 are defined as a first pick-up part 31, a second pick-up part 32, a third pick-up part 33 and a fourth pick-up part 34, respectively. Similarly, the pick-up cores 31a, 32a, 33a, and 34a corresponding to the respective pick-up parts 31, 32, 33 and 34 are defined as a first pick-up core 31a, a second pick-up core 32a, a third pick-up core 33a and a fourth pick-up core 34a, respectively.

Figure 6:
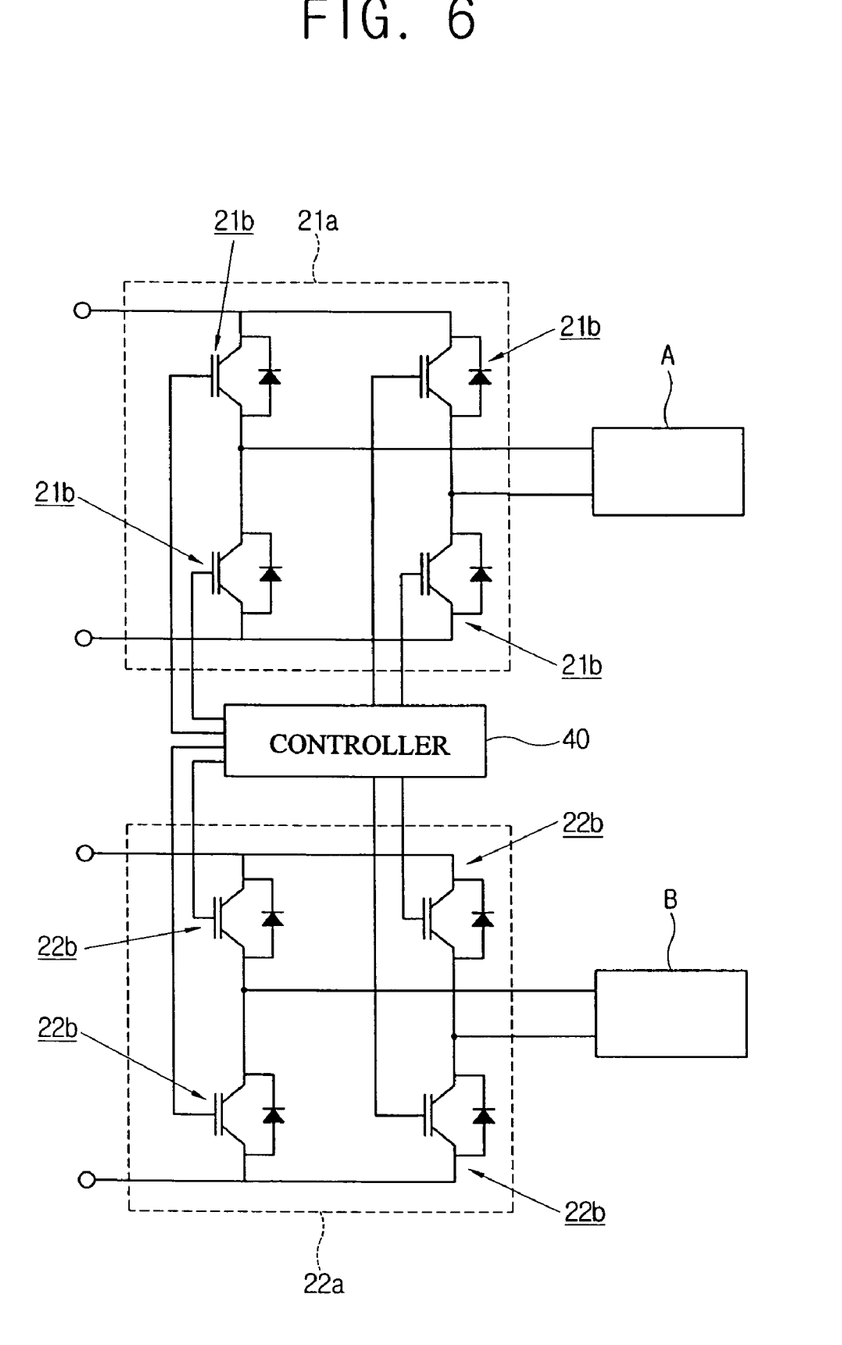
FIG. 6 shows structures of AC power supplies and a controller of the non-contact feeder system shown in FIG. 4.

Each of the AC power supplies 21 and 22 converts a commercial AC current supplied from an external source into an AC current with a high frequency to supply the converted AC current to a corresponding one of the feeding cables 11, 12, 13 and 14. According to an aspect of the present invention, the AC power supplies 21 and 22 are provided to supply AC currents with a high frequency to corresponding ones of the feeding cables 11, 12, 13 and 14. As shown in FIG. 6, each of the AC power supplies 21 and 22 may comprise a rectifying unit (not shown) to rectify and smooth the commercial AC current and inverters 21a and 22a to convert the rectified and smoothed direct current into the AC current and supply the AC current with the high frequency to the corresponding one of the feeding cables 11, 12, 13 and 14. The inverters 21a and 22a may be a bridge circuit comprising a plurality of switching elements 21b and 22b. The switching elements 21b and 22b are turned on/off according to control signals generated from the controller 40 and output the AC current with the high frequency.

Each of the AC power supplies 21 and 22 form a closed loop with the feeding cables 11 and 12 or 13 and 14. According to another aspect of the present invention, one of the AC power supplies 21 and 22, the first feeding cable 11, and the second feeding cable 12 form a closed loop, and the other one of the AC power supplies 21 and 22 form another closed loop with the third feeding cable 13 and the fourth feeding cable 14. Here, the AC power supply 21 that forms the closed loop with the first feeding cable 11 and the second feeding cable 12 is described as a first AC power supply, and the AC power supply 22 that forms the another closed loop with the third feeding cable 13 and the fourth feeding cable 14 is described as a second AC power supply. The inverter 21a of the first AC power supply 21 is described as a first inverter 21a while the inverter 22a of the second AC power supply 22 is described as a second inverter 21a.

The feeding cables 11, 12, 13 and 14 according to another aspect of the present invention are arranged substantially parallel along a moving direction of the electrical load 60. As shown in FIG. 4, the feeding cables 11, 12, 13 and 14 form parallel round cables A and B in a pair. According to yet another aspect of the present invention, the first feeding cable 11 and the second feeding cable 12 form a parallel round cable A (it is called as a first parallel round cable), and the third feeding cable 13 and the fourth feeding cable 14 form another parallel round cable B (it is called as a second parallel round cable). According to still another aspect of the present invention, the first parallel round cable A is positioned in a transverse direction to the pick-up parts 31 and 32, and the second parallel round cable B is positioned in a traverse direction to the pick-up parts 33 and 34 under the first parallel round cable A to face the first parallel round cable A.

Phases of the AC currents of the feeding cables 11, 12, 13 and 14 are the same, but directions of the AC currents of the feeding cables 11, 12, 13 and 14 positioned adjacent to one another are reverse with respect to one another. That is, the first feeding cable 11 and the second feeding cable 12 are arranged adjacent to each other to form the first parallel round cable A, so that the phases of the AC currents of the first feeding cable 11 and the second feeding cable 12 are the same, but the directions of the AC currents of the first feeding cable 11 and the second feeding cable 12 are reverse with respect to each other. Similarly, the third feeding cable 13 and the fourth feeding cable 14 are arranged adjacent to each other to form the second parallel round cable B, so that the phases of the AC currents of the third feeding cable 13 and the fourth feeding cable 14 are the same, but the directions of the AC currents of the third feeding cable 13 and the fourth feeding cable 14 are reverse with respect to each other. The controller 40 controls a phase and a direction of the AC current supplied from the corresponding one of the first AC power supply 21 and the second AC power supply 22, so that the phases of the first feeding cable 11 and the third feeding cable 13 positioned adjacent to each other are the same, but the directions of the AC currents of the first feeding cable 11 and the third feeding cable 13 are reverse with respect to each other.

Each of the feeding cables 11, 12, 13 and 14 is supported by a cable fixer. The cable fixer according to this embodiment of the present invention comprises a supporter 52, a cable supporting bar 51 having a first end connected to the feeding cables 11, 12, 13 and 14 and a second end connected to the supporter 52 to support the feeding cables 11, 12, 13 and 14.

The cable supporting bar 51 prevents the feeding cables 11, 12, 13 and 14 extending along a moving direction of the electrical load 60 from drooping due to the weight of the feeding cables 11, 12, 13 and 14. The cable supporting bar 51 may be provided in a plurality thereof at predetermined intervals along the feeding cables 11, 12, 13 and 14.

The cable supporting bar 51 is fixed on the supporter 52. The supporter 52 may be provided as a separate structure, but an external structure having a bottom surface, a wall, or a ceiling may be used as the supporter 52 without providing the supporter 52 as the separate structure if the bottom surface, the wall, or the ceiling on which the non-contact feeder system is positioned is disposed adjacent to the cable supporting bar 51.

Each of the pick-up parts 31, 32, 33 and 34 induces an induced current from a magnetic field formed by the AC current of the corresponding one of the feeding cables 11, 12, 13 and 14 to supply the induced current to the electrical load 60. The pick-up parts 31, 32, 33 and 34 move together with the electrical load 60 without being in contact with the feeding cables 11, 12, 13 and 14, respectively, when the electrical load 60 moves.

Each of the pick-up parts 31, 32, 33 and 34 according to this embodiment of the present invention may comprise a pick-up core 31a, 32a, 33a or 34a, respectively, to cover a corresponding one of the feeding cables 11, 12, 13 and 14 without being in contact with the feeding cables 11, 12, 13 and 14, and a pick-up coil 35 winding around a corresponding one of the pick-up core 31a, 32a, 33a and 34a.

Each of the pick-up cores 31a, 32a, 33a and 34a is of a substantially tubular shape and may be of a rectangular section in a transverse direction with respect to a moving direction of the electrical load 60. The pick-up cores 31a, 32a, 33a and 34a are positioned adjacent to one another in a closely contacting manner with one another, so that the pick-up cores 31a, 32a, 33a and 34a have a a cross-section having a matrix type structure in a transverse direction of the moving direction of the electrical load 60. As shown in FIG. 5, each of the pick-up cores 31a, 32a, 33a and 34a may be positioned to be in contact with one another, thereby decreasing a space to mount the non-contact feeder system.

Here, the directions of the currents of the feeding cables 11, 12, 13 and 14 passing through the corresponding ones of the pick-up cores 31a, 32a, 33a and 34a disposed adjacent to one another are reverse with respect to one another. For example, as described above, the AC current of the first feeding cable 11 passing through the first pick-up core 31a has the same phase as the AC currents of the second feeding cable 12 and the third pick-up cable 13 passing through the second and third pick-up cores 32a and 33a, respectively, that are adjacent to the first pick-up core 31a. However, the direction of the AC current of the first feeding cable 11 is opposite to the directions of the AC current of the second feeding cable 12 and the third feeding cable 13.

An opening 36 is formed on each of the pick-up cores 31a, 32a, 33a and 34a along a direction of the feeding cables 11, 12, 13 and 14, i.e., the moving direction of the electrical load 60. Thus, when the pick-up cores 31a, 32a, 33a and 34a move along the direction of the corresponding feeding cables 11, 12, 13 and 14, each of the pick-up cores 31a, 32a, 33a and 34a may move freely without being caught by the cable supporting bar 51.

The pick-up coil 35 is wound around the inside and the outside of each of the pick-up cores 31, 32, 33 and 34. For example, The pick-up coil 35 is connected to a rectifying unit (not shown) to transmit each of the currents induced by the magnetic field formed adjacent to each of the feeding cables 11, 12, 13 and 14 to the rectifying unit. The current rectified by the rectifying unit is supplied to a constant voltage controller (not shown), and the constant voltage controller supplies electrical power required for the electrical load 60 to the electrical load 60.

The pick-up coil 35 is wound around the pair of the pick-up cores 31a, 32a, 33a and 34a disposed adjacent to one another by closely contacting one another. As shown in FIG. 5, for example, the pick-up coil 35 is wound around the first pick-up core 31a and the second pick-up coil 32a which are disposed adjacent to contact each other, and another pick-up coil 35 is wound around the first pick-up core 31a and the third pick-up coil 33a that are disposed to contact each other. Thus, the pick-up cores 31a, 32a, 33a and 34a are contactable with one another, thereby decreasing the space to mount the pick-up parts 31, 32, 33 and 34.

The controller 40 controls a phase and a direction of each of the AC currents supplied from each of the AC power supplies 21 and 22 to the corresponding first parallel round cable A and second parallel round cable B, so that the magnetic fields formed around the corresponding the feeding cables 11, 12, 13 and 14 constructively interfere with one another. If the direction of the current of each of the feeding cables 11, 12, 13, and 14 is as described in FIG. 5, the magnetic fields formed around the corresponding the feeding cables 11, 12, 13 and 14 do not destructively interfere with one another. Here, the controller 40 may control each of the switching elements 21b, 22b of the inverters 21a and 22a of the AC power supplies 21 and 22 to be turned on/off, so that the direction and the phase of the AC current supplied from each of the AC power supplies 21 and 22 to the corresponding first parallel round cable A and second parallel round cable B are controlled.

For example, the controller 40 makes a timing and a period to turn on/off the switching element 21b and 22b of the first inverter 21a and the second inverter 22a the same, so that the phase of the AC current from the first AC power supply 21 and the phase of the AC current from the second AC power supply 22 become the same.

Further, the controller 40 determines which one of the switching elements 21b and 22b of the first inverter 21a and the second inverter 22a is turned on/off, so that the directions of the AC currents of the first feeding cable 11 and the third feeding cable 13 disposed adjacent to each other become reverse with respect to each other, and the directions of the second feeding cable 12 and the fourth feeding cable 14 disposed adjacent to each other become reverse with respect to each other. Thus, the AC currents flowing through the feeding cables 11, 12, 13 and 14 disposed adjacent to one another have reverse directions with respect to each other and the same phases, so that the magnetic fields formed around the feeding cables 11, 12, 13 and 14 constructively interfere with each other.

Figure 7:
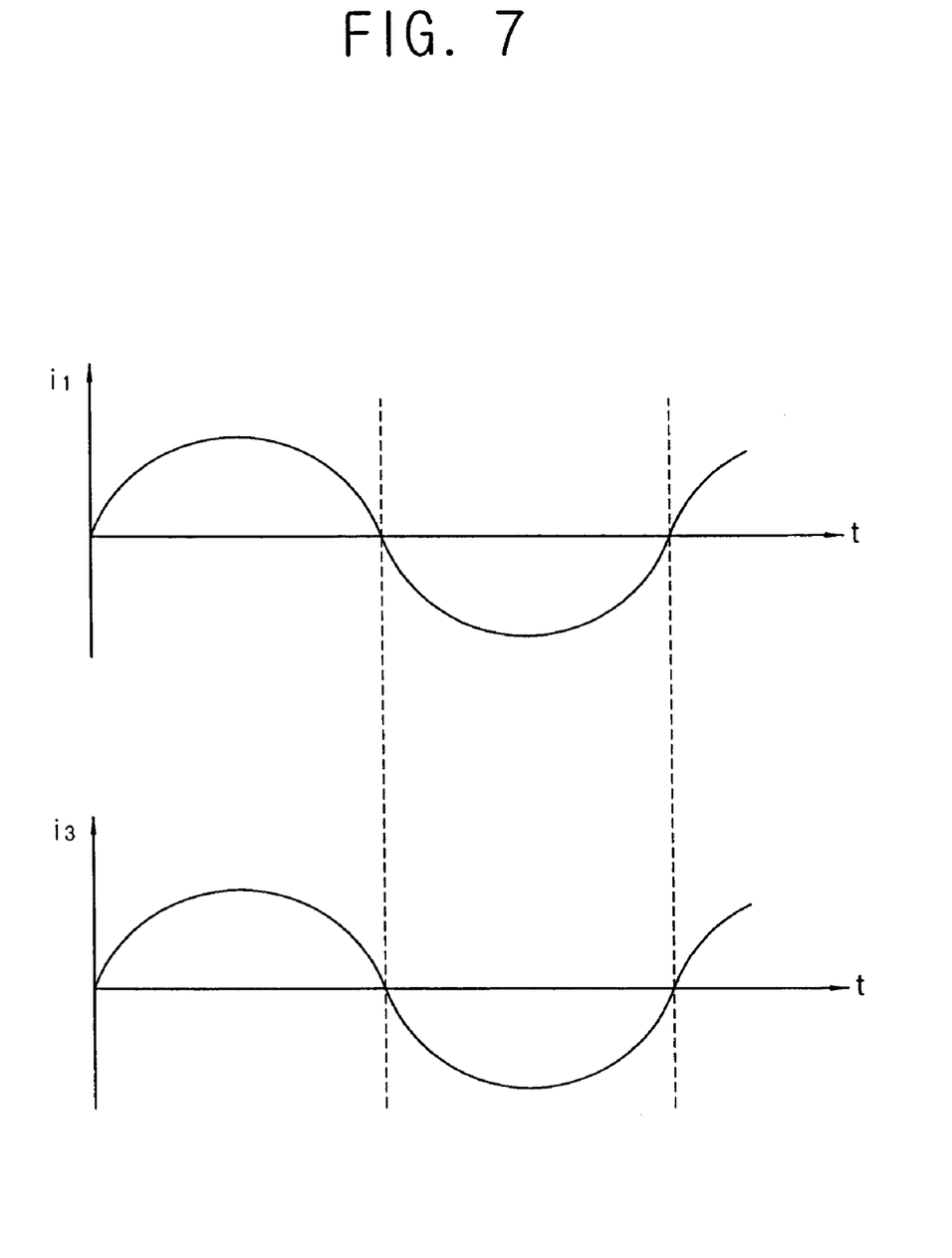
FIG. 7 shows waveforms of AC currents outputted from the AC power supplies of the non-contact feeder system shown in FIG. 4.

As shown in FIG. 7, the controller 40 controls the AC power supplies 21 and 22 for the AC currents i1 and i3 having wave forms to flow through the first feeding cable 11 and the third feeding cable 13, respectively.

Figure 8:
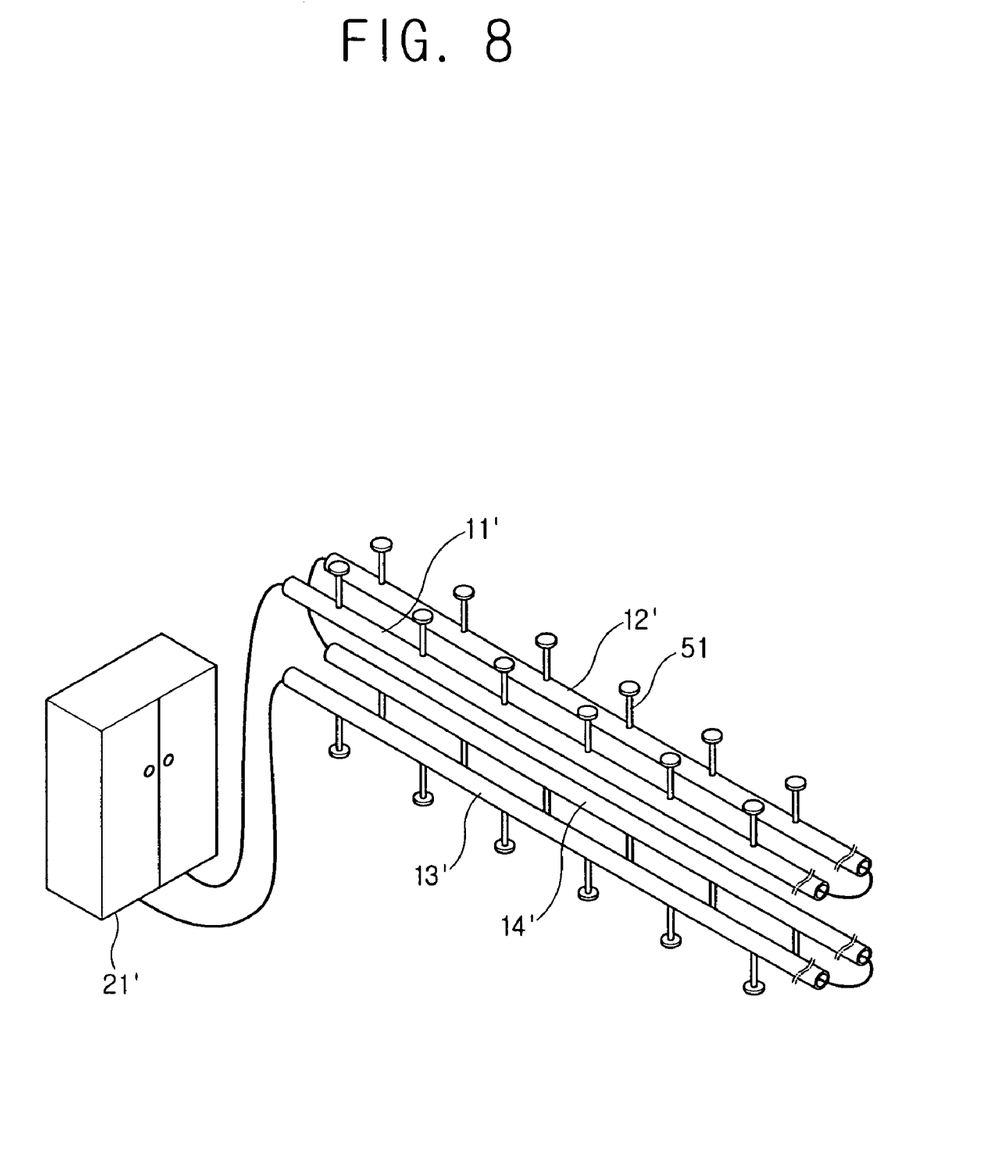
FIG. 8 shows a non-contact feeder system according to another embodiment of the present invention.

FIG. 8 shows a non-contact feeder system according to another embodiment of the present invention.

As shown in FIG. 8, the non-contact feeder system according to another embodiment of the present invention comprises feeding cables 11', 12', 13' and 14' which are connected in series and disposed parallel to the moving direction of the electrical load 60 of FIG. 4, and through which an AC current flows, so that directions of the AC current flowing through the feeding cables 11', 12', 13', and 14' are opposite to one another. Further, the non-contact feeder system according to this embodiment of the present invention comprises a single AC power supply 21', and the feeding cables 11', 12', 13' and 14' which are connected in series form a closed loop with the AC power supply 21'. Thus, without a controller 40 of FIG. 4, each of the magnetic fields formed around the corresponding ones of the feeding cables 11', 12', 13' and 14' can constructively interfere with one another if an arrangement of the feeding cables 11', 12', 13' and 14' are varied. Each of components used for the non-contact feeder system according to the previously described embodiment of the present invention, as shown in FIG. 4, can be used for the non-contact feeder system according to this embodiment of the present invention. Thus, a detailed description of the components is avoided.

Figure 9A:
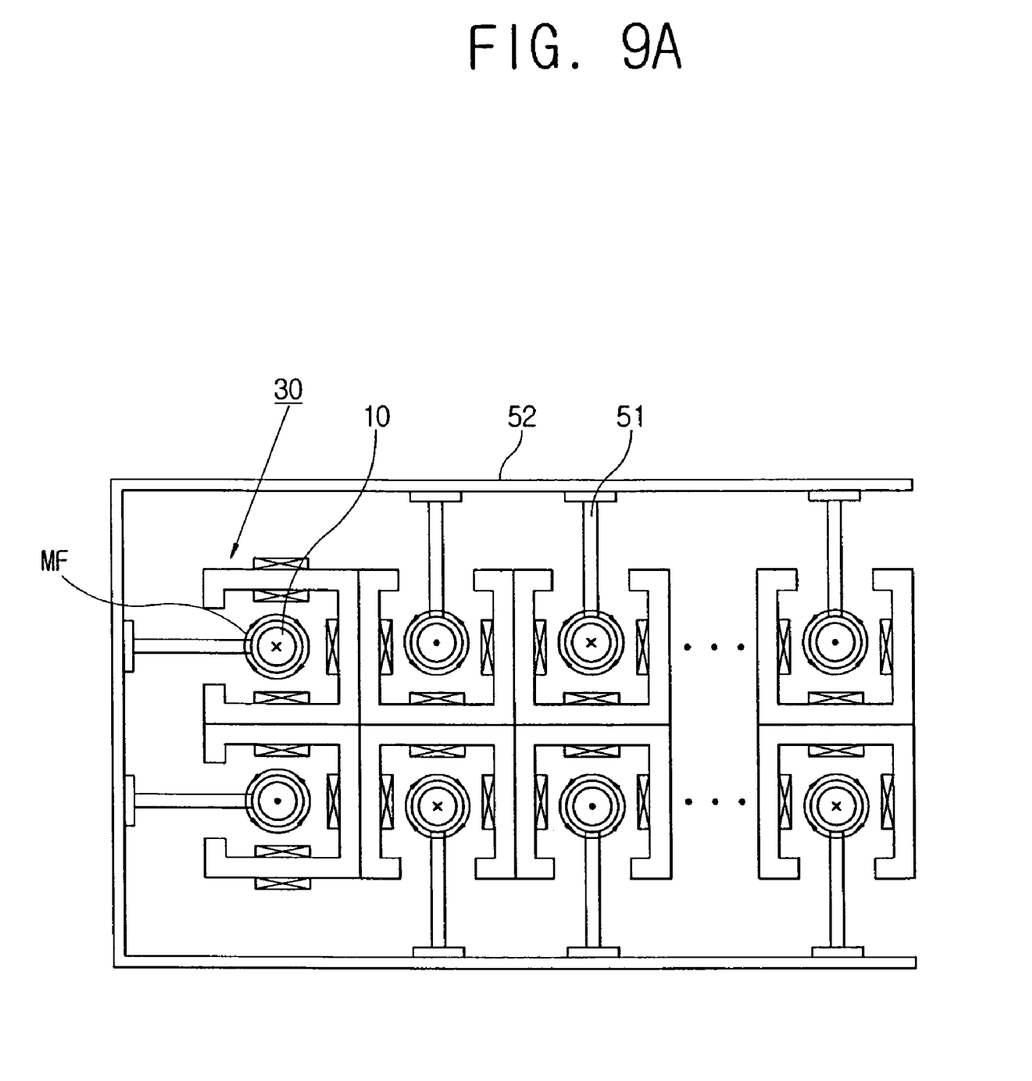
FIGS. 9A and 9B show a variety of structures to mount a plurality of feeding cables and a plurality of pick-up parts in a non-contact feeder system, according to another embodiment of the present invention.
Figure 9B:
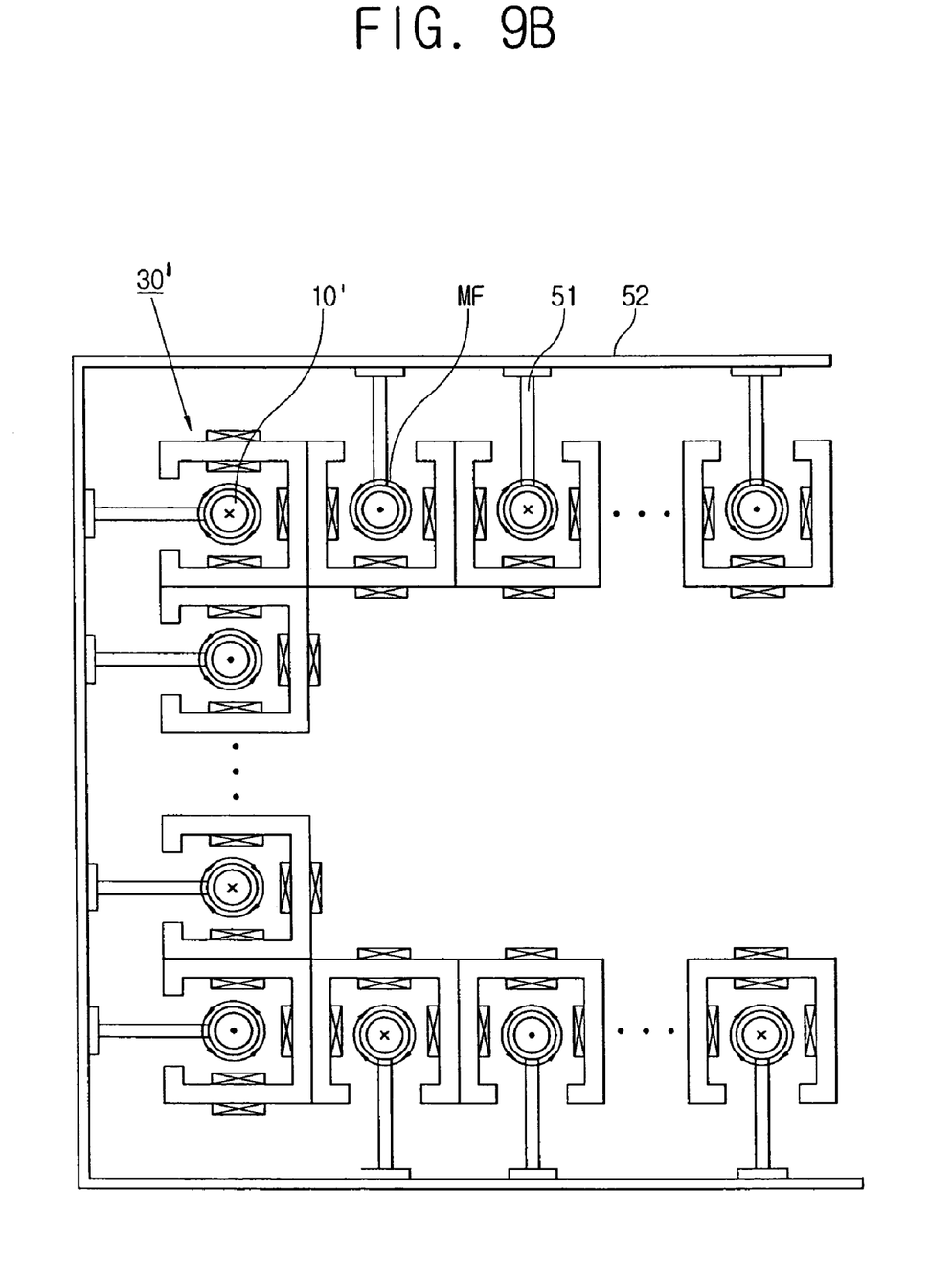

FIGS. 9A and 9B show sectional views of a non-contact feeder system having a plurality of feeding cables 10 and 10' and pick-up parts 30 and 30'. As shown in FIGS. 9A and 9B, in this non-contact feeder system, if magnetic fields MF formed around the feeding cables 10 and 10' disposed adjacent to one another constructively interfere with one another, a plurality of the feeding cables 10 and 10' and the pick-up parts 30 and 30' may be positioned adjacent to one another. Further, structures of cable supporters 51 and 52 to support a corresponding one of the feeding cables 10 and 10' may be varied, which is contained in the spirit of the present invention.

Moreover, in the non-contact feeder system shown in FIG. 4, each of the AC power supplies 21 and 22 is installed in an apparatus physically separated from each other. However, in the non-contact feeder system according to this embodiment of the present invention, two of the AC power supplies 21 and 22 may be installed together in an apparatus if the AC currents having two different waveforms can be supplied to the feeding cables 11, 12, 13 and 14.

As described above, the present invention provides the non-contact feeder system in which the space to mount the non-contact feeder system is decreased and the induced current is improved.

Although a few embodiments of the present invention have been shown and described, it will be appreciated by those skilled in the art that changes may be made in these embodiments without departing from the principles and spirit of the invention, the scope of which is defined in the appended claims.

What is claimed is:

1. A non-contact feeder system to supply an induced current to an electrical load comprising:
   at least three feeding cables arranged substantially parallel to one another along a moving direction of the electrical load;
   a plurality of AC power supplies to supply AC currents to the feeding cables;
   pick-up parts to supply an induced current induced from a magnetic field formed by a corresponding one of the AC currents flowing through corresponding ones of the feeding cables to the electrical load and to be movable along the corresponding one of the feeding cables without contacting the feeding cables as the electrical load moves; and
   a controller to control the plurality of the AC power supplies, so that phases of the AC currents supplied from each of the AC power supplies are the same, and directions of the AC currents flowing through the feeding cables positioned adjacent to one another are reverse with respect to one another.

2. The non-contact feeder system according to claim 1, wherein each of the AC power supplies comprises an inverter having a plurality of switch elements to supply the AC currents to corresponding ones of the feeding cables, and the controller controls the switching elements of each inverter to control the phase and the direction of the AC current outputted from each of the AC power supplies.

3. The non-contact feeder system according to claim 2, wherein the feeding cables comprise a pair of feeding cables connected at one end in series to form a parallel round cable, and connected at opposite end to one of the AC power supplies in series.

4. The non-contact feeder system according to claim 3, wherein the pick-up parts each comprises:
   a pick-up core of a tubular shape that winds around a corresponding one of the feeding cables without contacting the feeding cables and is arranged adjacent to another pick-up core of the other pick-up parts; and a pick-up coil wound around the pick-up core to supply the induced current induced from the magnetic field formed by the corresponding one of the feeding cables to the electrical load.

5. The non-contact feeder system according to claim 4, wherein the pick-up cores are of a substantially rectangular section in a transverse direction of a moving direction of the electrical load, and are arranged adjacent to one another and contact each other.

6. The non-contact feeder system according to claim 5, wherein directions of the AC currents of the feeding cables adjacent to one another are reverse with respect to one another.

7. The non-contact feeder system according to claim 5, wherein the pair of the feeding cables forming the parallel round cable pass through corresponding ones of the pick-up cores disposed adjacent to one another.

8. The non-contact feeder system according to claim 5, wherein the pick-up coil is wound around the pair of the pick-up cores disposed adjacent to one another.

9. The non-contact feeder system according to claim 1, wherein the at least three feeding cables are disposed adjacent to one another and are each connected in series with one other feeding cable, so that the AC currents supplied from each of the AC power supplies have directions reverse with respect to one another.

10. A non-contact feeder system to supply an induced current to an electrical load, comprising:
    at least three feeding cables arranged substantially parallel to one another along a moving direction of the electrical load;
    a plurality of AC power supplies to supply an AC current to the feeding cables; and pick-up parts to supply an induced current induced from a magnetic field formed by the AC current flowing through each of the feeding cables to the electrical load and to be movable along each of the feeding cables without contacting each of the feeding cables as the electrical load moves,
    wherein pairs of the feeding cables are electrically connected in series and are arranged so that directions of AC currents passing through each of the feeding cables disposed adjacent to one another are reverse with respect to one another.

11. The non-contact feeder system according to claim 10, wherein each of the pick-up parts comprises:
    a pick-up core of a tubular shape that winds around a corresponding one of the feeding cables without making contacting therewith and is arranged adjacent to another pick-up core; and
    a pick-up coil wound around the pick-up core to supply the induced current induced from the magnetic field formed by the corresponding one of the feeding cables to the electrical load.

12. The non-contact feeder system according to claim 11, wherein the pick-up cores are of a rectangular section in a transverse direction of a moving direction of the electrical load and arranged adjacent to one another by closely contacting one another.

13. The non-contact feeder system according to claim 12, wherein directions of AC currents of the feeding cables passing through the corresponding ones of the pick-up cores disposed adjacent to one another are reverse with respect to one another.

14. The non-contact feeder system according to claim 12, wherein the pick-up coil is wound around a pair of pick-up cores disposed adjacent to each other.

15. A non-contact feeder system to supply an induced current to an electrical load, comprising:
    first, second, and third feeding cables disposed in a direction parallel to a moving direction of the electrical load; and
    first, second, and third pick-up cores disposed to generate the induced current from the first, second, and third feeding cables, respectively, wherein the first pickup core comprises first and second sides disposed to contact sides of the second and third pick-up cores, respectively.

16. The non-contact feeder system according to claim 15, further comprising:
    a first pick-up coil winding around the side of the second pick-up core and the first side of the first pick-up core; and
    a second pick-up coil winding around the side of the third pick-up core and the second side of the first pick-up core.

17. The non-contact feeder system according to claim 15, wherein the first and second sides are perpendicular to each other.

18. The non-contact feeder system according to claim 15, wherein the first, second, and third pick-up cores form an integrated body.

19. The non-contact feeder system according to claim 15, wherein the side of the second pick-up core and the first side of the first pick-up core do not have a gap therebetween, and the side of the third pick-up core and the second side of the first pick-up core do not have a gap therebetween.

20. The non-contact feeder system according to claim 15, further comprising:
    a fourth feeding cable disposed in a direction parallel to a moving direction of the electrical load; and
    a fourth pick-up core disposed to generate the induced current from the fourth feeding cable, wherein the fourth pick-up core comprises third and fourth sides disposed to contact other sides of the second and third pick-up cores, respectively.

21. The non-contact feeder system according to claim 20, further comprising:
    a third pick-up coil winding around the other side of the second pick-up core and the third side of the fourth pick-up core; and
    a fourth pick-up coil winding around the other side of the third pickup core and the fourth side of the fourth pickup core.

22. The non-contact feeder system according to claim 20, wherein the third and fourth sides of the fourth pick-up core are perpendicular to each other.

23. The non-contact feeder system according to claim 20, wherein the first, second, third, and fourth pick-up cores form an integrated body.

24. The non-contact feeder system according to claim 20, wherein the side of the third pick-up core and the second side of the first pick-up core do not have a gap therebetween, and the other side of the second pick-up core and the third side of the fourth pick-up core do not have a gap therebetween.

25. A non contact feeder system to supply an induced current to an electrical load, the system comprising:
    at least two pairs of adjacent feeding cables arranged substantially parallel to one another along a moving direction of the electrical load and having AC currents conducted therethrough;
    one or more pick up parts to supply an induced current induced from a magnetic field formed by the AC currents conducted through corresponding ones of the at least two pairs of adjacent feeding cables to the electrical load and to be movable along the corresponding ones of the at least two pairs of adjacent feeding cables without contacting the at least two pairs of adjacent feeding cables as the electrical load moves; and a controller to control the AC currents conducted through the at least two pairs of adjacent feeding cables such that magnetic fields produced by two feeding cables in each pair constructively interfere with each other.

* * * * *